US010044980B1

(12) United States Patent
Graham et al.

(10) Patent No.: US 10,044,980 B1
(45) Date of Patent: Aug. 7, 2018

(54) CONFERENCE MANAGEMENT (71) Applicant: International Business Machines Corporation, Armonk, NY (US)

(72) Inventors: Scott W. Graham, Boulder, CO (US); Lior Luker, Tel Aviv (IL); Nitzan Nissim, Ness Ziona (IL); Brian L. Pulito, Lexington, KY (US)

(73) Assignee: International Busines Machines Corporation, Armonk, NY (US)

( * ) Notice: Subject to any disclaimer, the term of this patent is extended or adjusted under 35 U.S.C. 154(b) by 0 days.

(21) Appl. No.: 15/424,968

(22) Filed: Feb. 6, 2017

(51) Int. Cl.
*H04N 7/15* (2006.01)
*H04L 29/06* (2006.01)
*G11B 27/10* (2006.01)
*G06K 9/00* (2006.01)

(52) U.S. Cl.
CPC .......... *H04N 7/15* (2013.01); *G06K 9/00255* (2013.01); *G11B 27/10* (2013.01); *H04L 65/1006* (2013.01)

(58) Field of Classification Search
None
See application file for complete search history.

(56) References Cited

U.S. PATENT DOCUMENTS

| 5,548,346 | A | * | 8/1996 | Mimura | ................. | H04N 5/147 348/14.1 |
| 6,011,868 | A | * | 1/2000 | van den Branden | .... | H04N 7/52 348/E17.003 |
| 8,131,012 | B2 | | 3/2012 | Eaton et al. | | |
| 8,189,905 | B2 | | 5/2012 | Eaton et al. | | |
| 8,533,346 | B2 | | 9/2013 | Cao et al. | | |
| 8,559,914 | B2 | * | 10/2013 | Jones | ................... | G08B 13/196 340/539.11 |
| 2009/0154659 | A1 | | 6/2009 | Morin | | |

(Continued)

FOREIGN PATENT DOCUMENTS

| CN | 101729880 A | 6/2010 |
| CN | 202940918 U | 5/2013 |

(Continued)

OTHER PUBLICATIONS

Chunmiao Yuan et al., "The Scheme of SIP-Based Video Surveillance System", IEEE, Education Technology and Computer Science (ETCS), 2010 Second International Workshop on (vol. 3), 2 pages.

(Continued)

*Primary Examiner* — Creighton Smith
(74) *Attorney, Agent, or Firm* — William H. Hartwell; Hunter E. Webb; Keohane & D'Alessandro, PLLC (57) ABSTRACT

In some examples, a system for conference management can include a processor to initiate a conference comprising a plurality of cameras and at least one user and process a series of images with at least one service to generate service output, the series of images comprising an aggregation of images from the plurality of cameras. The processor can also detect metadata associated with each of the series of images by the at least one service and aggregate the metadata and the service output based on a timestamp for each image to detect an event. Furthermore, the processor can generate an alarm in response to detecting the event and modify the conference by adding additional cameras or additional users.

19 Claims, 6 Drawing Sheets

(56) References Cited

U.S. PATENT DOCUMENTS

| | | | | |
|---|---|---|---|---|
| 2011/0063440 | A1* | 3/2011 | Neustaedter | H04N 5/144 348/143 |
| 2015/0055937 | A1* | 2/2015 | Van Hoff | H04N 13/0014 386/285 |
| 2015/0326666 | A1* | 11/2015 | Martin | H04W 12/06 707/620 |
| 2016/0132928 | A1* | 5/2016 | Adoni | G06Q 30/0261 705/14.58 |
| 2016/0132949 | A1* | 5/2016 | Adoni | G06Q 30/0261 705/26.41 |
| 2016/0165187 | A1* | 6/2016 | Rasheed | G06K 9/3241 348/143 |
| 2016/0328789 | A1* | 11/2016 | Grosz | G06F 3/0484 |
| 2016/0360157 | A1* | 12/2016 | Renkis | H04N 7/181 |
| 2017/0062010 | A1* | 3/2017 | Pappu | G10L 15/265 |
| 2017/0129403 | A1* | 5/2017 | Lavoie | B60R 1/00 |
| 2017/0180899 | A1* | 6/2017 | Proctor, Jr. | H04R 29/007 |

FOREIGN PATENT DOCUMENTS

| | | |
|---|---|---|
| CN | 103414607 A | 11/2013 |
| EP | 1 650 927 A2 | 4/2006 |

OTHER PUBLICATIONS

Gang Wu et al., "Multi-camera Spatia-temporal Fusion and Biased Sequence-data Learning for Security Surveillance", Multimedia '03 Proceedings of the eleventh ACM International conference on Multimedia, Berkeley, CA, USA, Nov. 2-8, 2003, Copyright 2003, 8 pages.

Raju Rangaswami et al., "The SfinX Video Surveillance System", 2004, 4 pages.

BRSLABS, BRS Labs Granted U.S. Patent for Behavioral Recognition System, "AISight 3.0 Video Surveillance Technology Brings Advanced Machine Intelligence to Physical Security Industry", Mar. 27, 2012, 3 pages.

* cited by examiner

CONFERENCE MANAGEMENT

BACKGROUND

The present disclosure relates to digital conferences, and more specifically, but not exclusively, to managing digital conferences based on detected events.

SUMMARY

According to an embodiment described herein, a system for conference management can include a processor to initiate a conference comprising a plurality of cameras and at least one user. The processor can also process a series of images with at least one service to generate service output, the series of images comprising an aggregation of images from the plurality of cameras. Additionally, the processor can detect metadata associated with each of the series of images by the at least one service and aggregate the metadata and the service output based on a timestamp for each image to detect an event. Furthermore, the processor can generate an alarm in response to detecting the event and modify the conference by adding additional cameras or additional users.

According to another embodiment, a method for conference management can include initiating a conference comprising a plurality of cameras and at least one user and processing a series of images with at least one service to generate service output, the series of images comprising an aggregation of images from the plurality of cameras. The method can also include detecting metadata associated with each of the series of images by the at least one service and aggregating the metadata and the service output based on a timestamp for each image to detect an event. Furthermore, the method can include generating an alarm in response to detecting the event and modifying the conference by adding additional cameras or additional users.

According to another embodiment, a computer program product for conference management can include a computer readable storage medium having program instructions embodied therewith, wherein the computer readable storage medium is not a transitory signal per se. The program instructions can be executable by a processor to cause the processor to initiate a conference comprising a plurality of cameras and at least one user and process a series of images with at least one service to generate service output, the series of images comprising an aggregation of images from the plurality of cameras. The program instructions can also be executable by the processor to cause the processor to detect metadata associated with each of the series of images by the at least one service and aggregate the metadata and the service output based on a timestamp for each image to detect an event. Furthermore, the program instructions can be executable by the processor to cause the processor to generate an alarm in response to detecting the event and modify the conference by adding additional cameras or additional users.

DETAILED DESCRIPTION

As digital cameras are attached to a growing number of computing devices in different environments, image processing techniques have become more and more complex. In some examples, there are cognitive tools that can identify objects in visual input. These cognitive tools can identify basic patterns and objects in an image using facial recognition software and the like.

The techniques described herein can manage a shared context of multiple sessions in a conference of cameras to identify patterns and objects. The techniques described herein can enable adding more relevant visual input sources as well as relevant viewers in an automated fashion. In some embodiments, the techniques described herein utilize the Session Initiation Protocol (SIP), which is an IETF standard of a signaling protocol used for the establishment, control and routing of media sessions over an internet connection. In some examples, SIP can also enable the transmission of metadata. The techniques enable generating a composition of inputs that can result in detecting events and providing alarms.

The embodiments described herein include techniques for managing conferences. In some examples, a device can initiate a conference comprising a plurality of cameras and at least one user. A conference, as referred to herein, can include any suitable application that enables multiple users to view data collected from any number of sensors or digital cameras, among others. In some embodiments, a conference can transmit data collected from the sensors and digital cameras to any number of users in real-time. In some examples, a device can process a series of images with at least one service to generate service output. Service output, as referred to herein, can include any suitable information computed based on images received from a service. In some examples, a service can include facial recognition software or object identification software, among others. The series of images can include an aggregation of images from a plurality of cameras.

In some embodiments, the device can also detect metadata associated with each of the series of images by the at least one service and aggregate the metadata and the service output based on a timestamp for each image to detect an event. The device can also generate an alarm in response to detecting the event and modify the conference by adding additional cameras or additional users.

Figure 1:
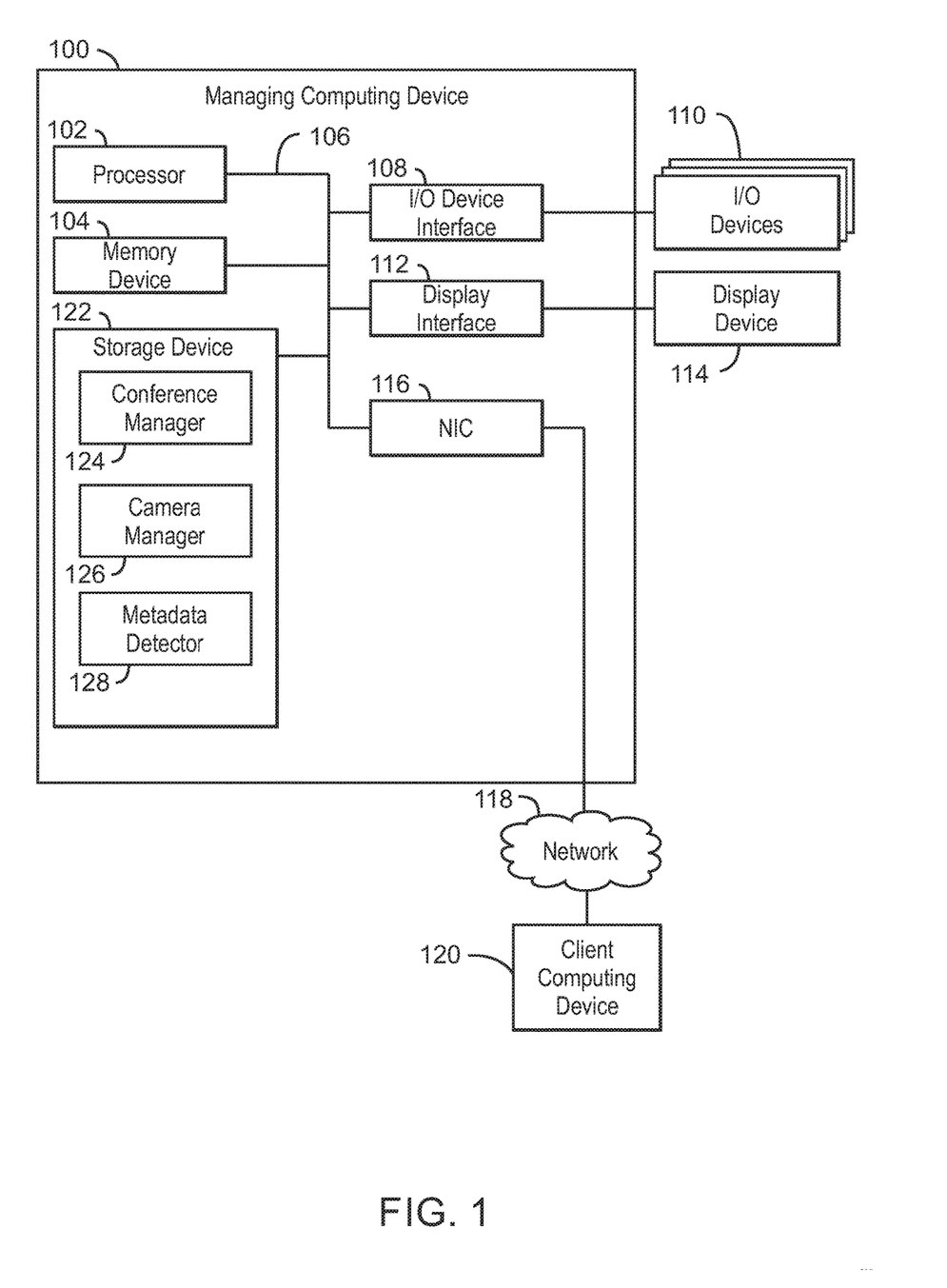
FIG. 1 depicts a block diagram of an example computing system that can manage conferences according to an embodiment described herein.

With reference now to FIG. 1, an example computing device is depicted that can manage conferences. The managing computing device 100 may be for example, a server, desktop computer, laptop computer, tablet computer, or smartphone. In some examples, managing computing device 100 may be a cloud computing node. Managing computing device 100 may be described in the general context of computer system executable instructions, such as program modules, being executed by a computer system. Generally, program modules may include routines, programs, objects, components, logic, data structures, and so on that perform particular tasks or implement particular abstract data types. Managing computing device 100 may be practiced in distributed cloud computing environments where tasks are performed by remote processing devices that are linked through a communications network. In a distributed cloud computing environment, program modules may be located in both local and remote computer system storage media including memory storage devices.

The managing computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the managing computing device 100 to one or more I/O devices 110. The I/O devices 110 may include, for example, a keyboard and a pointing device, wherein the pointing device may include a touchpad or a touchscreen, among others. The I/O devices 110 may be built-in components of the managing computing device 100, or may be devices that are externally connected to the managing computing device 100.

The processor 102 may also be linked through the system interconnect 106 to a display interface 112 adapted to connect the managing computing device 100 to a display device 114. The display device 114 may include a display screen that is a built-in component of the managing computing device 100. The display device 114 may also include a computer monitor, television, or projector, among others, that is externally connected to the managing computing device 100. In addition, a network interface controller (NIC) 116 may be adapted to connect the managing computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A client computing device 120 may connect to the managing computing device 100 through the network 118. In some examples, client computing device 120 can send a request for data corresponding to a conference.

The processor 102 may also be linked through the system interconnect 106 to a storage device 122 that can include a hard drive, an optical drive, a USB flash drive, an array of drives, or any combinations thereof. In some examples, the storage device 122 may include a conference manager 124 that can initiate a conference comprising a plurality of cameras and at least one user. In some embodiments, a camera manager 126 can process a series of images with at least one service to generate service output, the series of images comprising an aggregation of images from the plurality of cameras. In some embodiments, a metadata detector 128 can detect metadata associated with each of the series of images by the at least one service. In some embodiments, the conference manager 124 can aggregate the metadata and the service output based on a timestamp for each image to detect an event. The conference manager 124 can also generate an alarm in response to detecting the event and modify the conference by adding additional cameras or additional users.

It is to be understood that the block diagram of FIG. 1 is not intended to indicate that the managing computing device 100 is to include all of the components shown in FIG. 1. Rather, the managing computing device 100 can include fewer or additional components not illustrated in FIG. 1 (e.g., additional memory components, embedded controllers, modules, additional network interfaces, etc.). Furthermore, any of the functionalities of the conference manager 124, the camera manager 126, and the metadata detector 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the conference manager 124, the camera manager 126, and the metadata detector 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
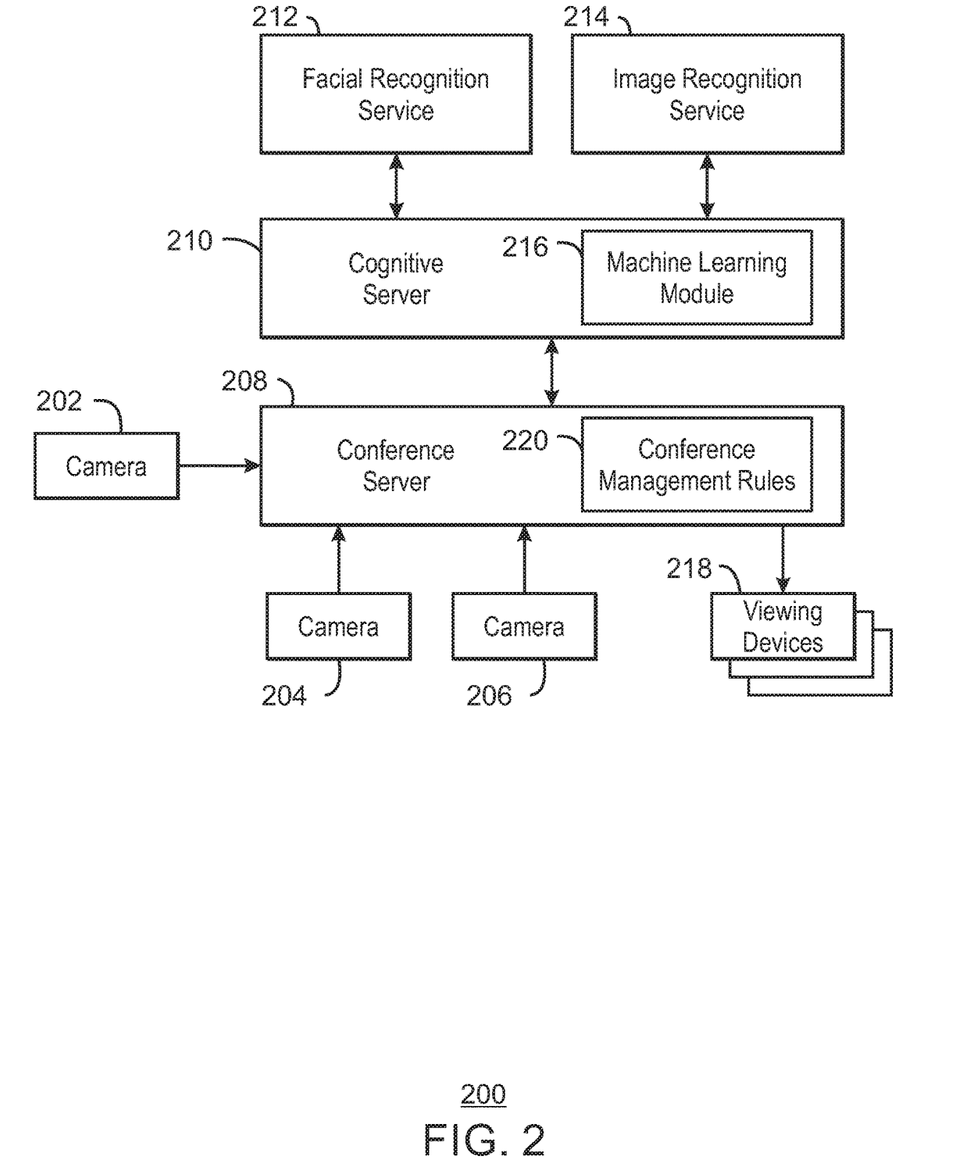
FIG. 2 is a block diagram of a system for managing conferences.

FIG. 2 is a block diagram illustrating an example system for managing a conference. In some examples, any suitable number of cameras 202, 204, and 206 can be electrically coupled to a conference server 208. The conference server 208 can initiate a conference by transmitting an invite command to the cameras 202, 204, and 206. The invite command can be used to route information collected from the cameras 202, 204, and 206 to the conference server 208.

In some embodiments, the conference server 208 can forward the video streams from the cameras 202, 204, and 206 to a cognitive server 210. In some examples, the conference server 208 can generate a single stream of video content by combining the images from the cameras 202, 204, and 206. The cognitive server 210 can separate the video streams into images based on a configurable rate of images per second. In some examples, the cognitive server 210 can send the images to services for analysis. For example, a facial recognition service 212 may analyze images and transmit tags (also referred to herein as service output) corresponding to identified faces in the images to the cognitive server 210. In some examples, an image recognition server 214 can analyze the images and transmit tags corresponding to identified objects in the images to the cognitive server 210. In some embodiments, the cognitive server 210 can send the images to the facial recognition service 212 and the image recognition service 214 in any suitable order. For example, the cognitive server 210 may send images to the image recognition server 214 first and if a face is detected, the images may be transmitted to the facial recognition service 212. In some examples, any suitable number of additional services can analyze the images and provide additional information to the cognitive server 210. In some examples, the tags provided by the facial recognition service 212 and the image recognition service 214 can include additional data such as camera identifiers, known distance from fixed elements in the image, timestamps, and possibly data collected from attached sensors of various kinds, among others.

In some embodiments, the cognitive server 210 can transmit the images and tags to a machine learning module 216. In some examples, the machine learning module 216 can be trained using the same input sources to recognize events of interest. In some embodiments, the machine learning module 216 can trigger an alarm based on a detected event. The machine learning module 216 can provide an event description and a session identifier to the conference server 208. In some embodiments, the conference server 208 can use the session identifier to join additional viewing devices 218, such as viewers, users, cameras, sensors, and the like, based on predetermined conference management rules 220. The predetermined conference management rules 220 can indicate conditions for joining additional viewing devices 218.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional memory components, embedded controllers, modules, additional network interfaces, etc.).

Figure 3:
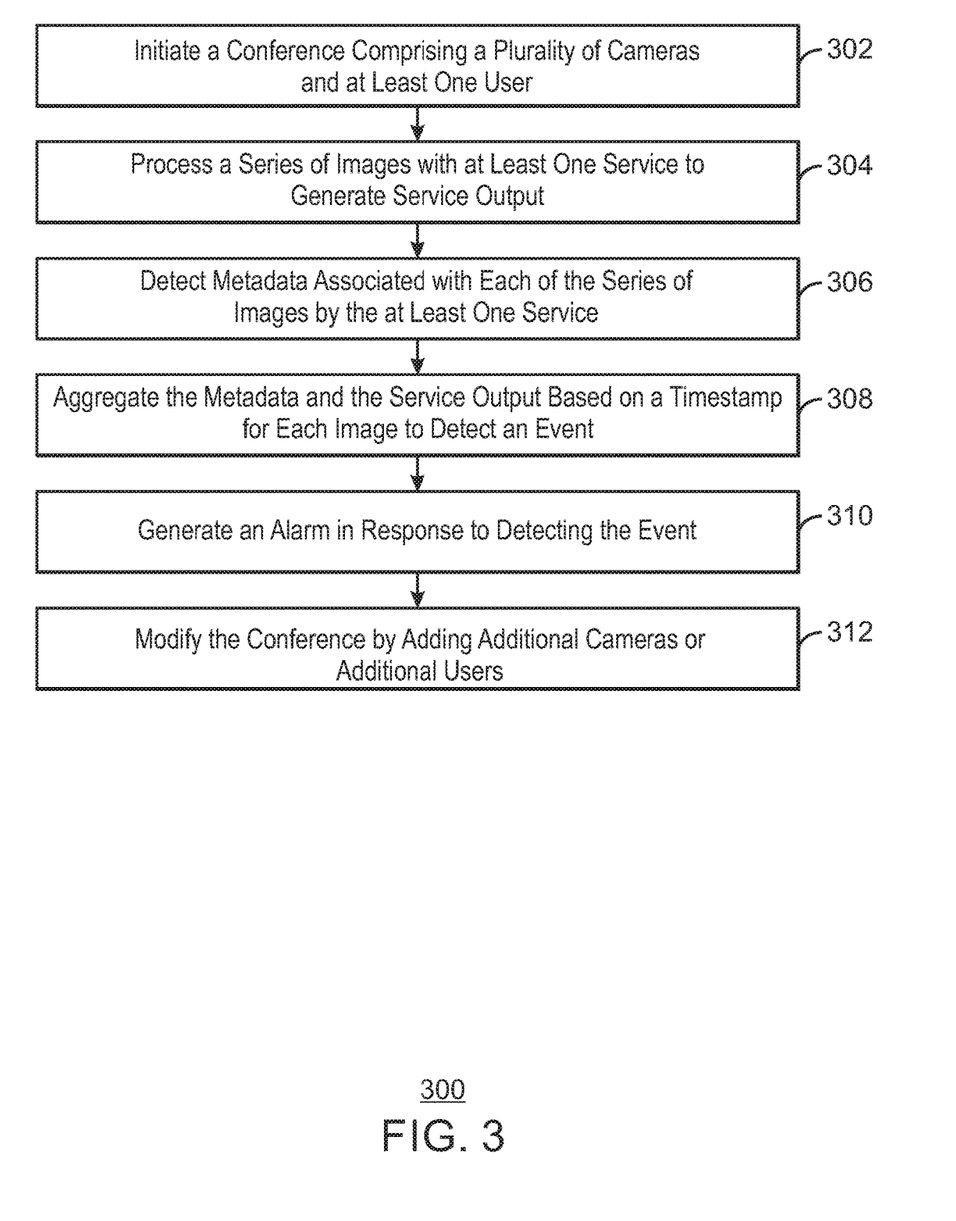
FIG. 3 is a process flow diagram of an example method that can manage conferences according to an embodiment described herein.

FIG. 3 is a process flow diagram of an example method that can manage conferences. The method 300 can be implemented with any suitable computing device, such as the computing device 100 of FIG. 1.

At block 302, a conference manager 124 can initiate a conference comprising a plurality of cameras and at least one user. In some embodiments, a conference can include any suitable application or application instance in which users can view information collected from cameras, sensors, and other devices. In some examples, the information displayed by the conference can correspond to real-time data. In some embodiments, the conference can be an SIP conference.

At block 304, a camera manager 126 can process a series of images with at least one service to generate service output. For example, the camera manager 126 can transmit images from any number of cameras to a service such as a facial recognition service, an image recognition service, and the like. In some embodiments, the camera manager 126 can obtain the images from the cameras by separating video streams from the cameras into images. For example, the camera manager 126 can separate a video stream from each camera into the series of images based on a configuration rate of images per second.

In some examples, the series of images can include an aggregation of images from the plurality of cameras. The service output can include any information corresponding to analysis by a service of an image. For example, service output can indicate an identified object from an image, an identified face or user from an image, and the like. In some embodiments, the service output can include generating a three dimensional view of an object based on the aggregated images. In some examples, events can be logged and used to train a service each time an event is logged.

At block 306, a metadata detector 128 can detect metadata associated with each of the series of images by the at least one service. For example, the metadata can indicate a distance between a camera and an object in an image, a time the image was captured by a camera, and a location of a camera, among others. In some examples, the metadata detector 128 can detect the metadata from a camera or a service. For example, a service may add information to the metadata based on analysis such as the distance from an object to a camera.

At block 308, the conference manager 124 can aggregate the metadata and the service output based on a timestamp for each image to detect an event. For example, the conference manager 124 can detect a timestamp in the metadata that indicates the time an image was captured by a camera. The conference manager 124 can aggregate or combine the metadata, service output, and timestamp data for each image to detect an event. An event, as referred to herein, can include detecting an object or person within any suitable environment, or any other suitable characteristic identified for an environment. For example, an event can include detecting a person of interest in a secure region of a building or environment. The event can also include detecting any suitable object of interest in a building or an environment. Furthermore, an event can include detecting a threshold number of objects or people in an environment. An event can also include an action performed by an individual captured in the series of images. In some embodiments, the timestamps can be used to analyze an object, person, or an action from different perspectives. For example, images captured by cameras surrounding an environment can be compared based on timestamp to provide a three dimensional perspective of an environment.

In some embodiments, the conference manager 124 can detect audio captured by the plurality of cameras and associate the audio with each image based on the timestamp. In some examples, the conference manager 124 can separate an audio stream and the video stream and analyze the audio stream and the video stream separately. For example, the conference manager 124 may transmit the audio stream to an audio analyzer service that can detect speech patterns, audible sounds, and the like. The output from an audio analyzer service can be combined with the service output from other services to result in generating an alarm.

At block 310, the conference manager 124 can also generate an alarm in response to detecting the event. For example, the conference manager 124 can generate an alarm based on a detected event. The conference manager 124 can send the alarm to a browser, as an email, or a notification to a mobile device, among others. In some embodiments, the conference manager 124 can establish threshold levels according to events and generate an alarm if an event is detected that exceeds a threshold. For example, detected events may be prioritized based on predetermined characteristics. In some embodiments, a detected event may result in an alarm if the detected event corresponds to predetermined characteristics associated with a particular threshold. For example, the conference manager 124 can group objects or persons of interest into different groups based on a significance value. In some embodiments, the significance value can indicate how sought after the object or person may be. The conference manager 124 may not generate an alarm if an object or person of interest is identified with a low significance value. In some embodiments, the conference manager 124 can modify the significance value.

At block 312, the conference manager 124 can modify the conference by adding additional cameras or additional users. For example, the conference manager 124 can access conference rules that indicate particular users or cameras to add to the conference in response to a detected event. In some embodiments, an identified object can correspond to a list of viewers to automatically add to the conference to enable the viewers to see real-time information about a detected event. In some embodiments, the conference manager 124 can modify the conference by adding additional sensors to collect sensor data. For example, the conference manager 124 can add information to the conference from any suitable sensor such as an accelerometer, gyrometer, altimeter, motion detectors, and the like. In some embodiments, the conference manager 124 can also provide viewers with the ability to separate video information from audio information.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the conference manager 124 can also record the conference to enable any number of users or viewers to verify the object or objects resulting in the detected event were accurately analyzed. In some embodiments, the conference manager 124 can pixelate faces of people captured in images or alter the faces of people in any suitable way. In some examples, the conference manager 124 can detect facial features of people in images and store the facial features in an anonymized format.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
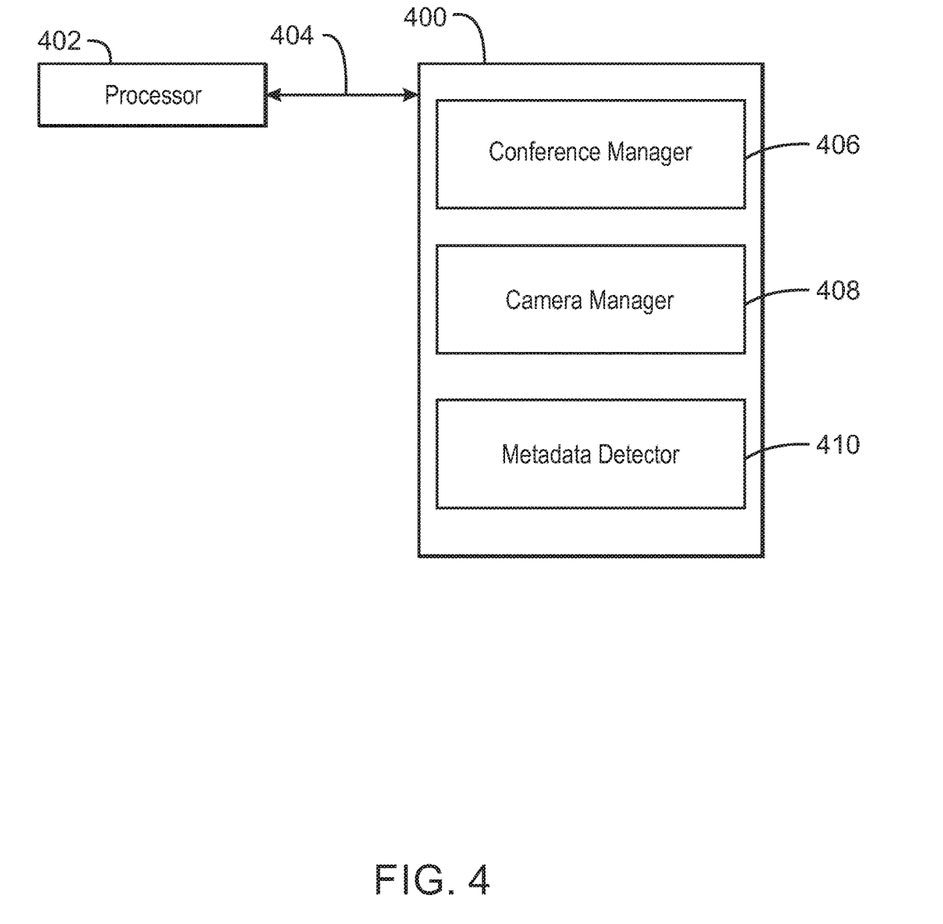
FIG. 4 is a tangible, non-transitory computer-readable medium that can manage conferences according to an embodiment described herein.

Referring now to FIG. 4, a block diagram is depicted of an example of a tangible, non-transitory computer-readable medium that can manage conferences. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method. For example, a conference manager 406 that can initiate a conference comprising a plurality of cameras and at least one user. In some embodiments, a camera manager 408 can process a series of images with at least one service to generate service output, the series of images comprising an aggregation of images from the plurality of cameras. In some embodiments, a metadata detector 410 can detect metadata associated with each of the series of images by the at least one service. In some embodiments, the conference manager 406 can aggregate the metadata and the service output based on a timestamp for each image to detect an event. The conference manager 406 can also generate an alarm in response to detecting the event and modify the conference by adding additional cameras or additional users It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
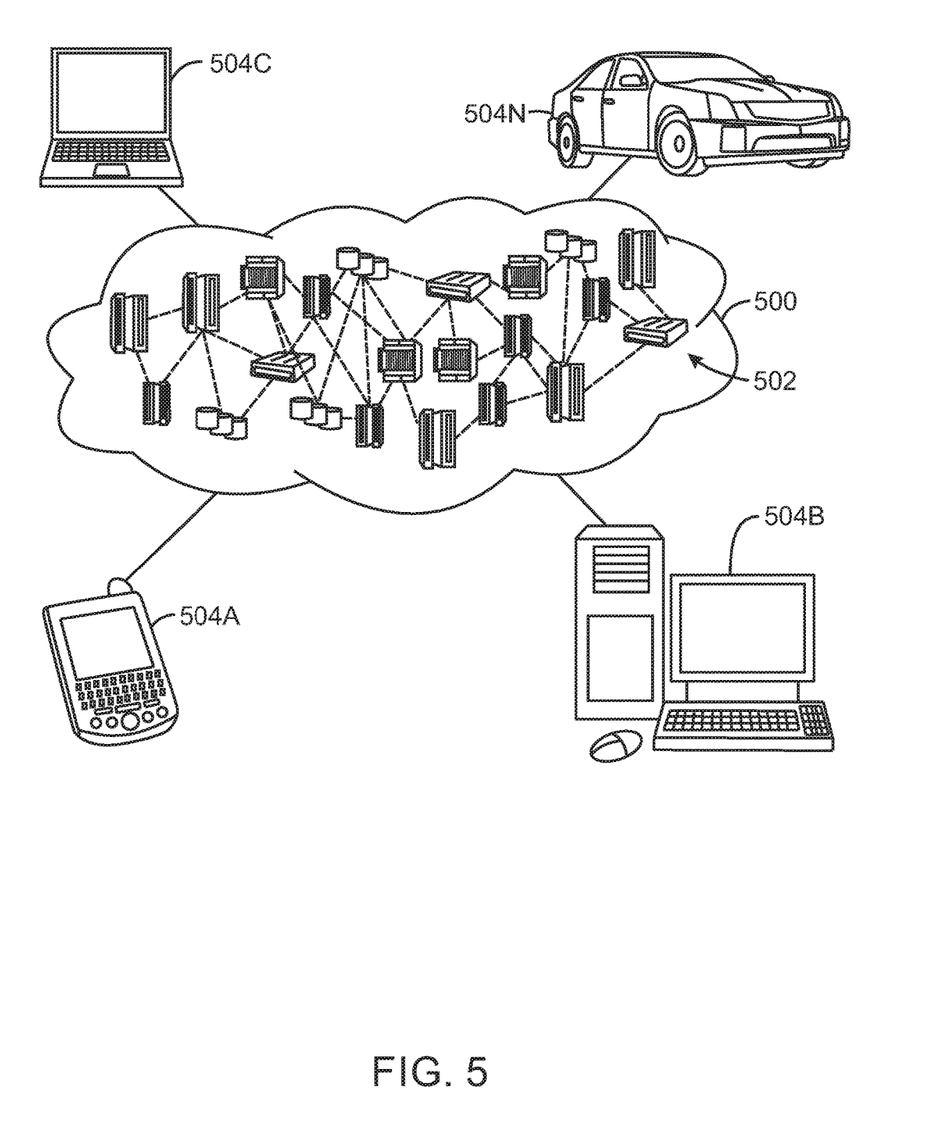
FIG. 5 depicts an illustrative cloud computing environment according to an embodiment described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
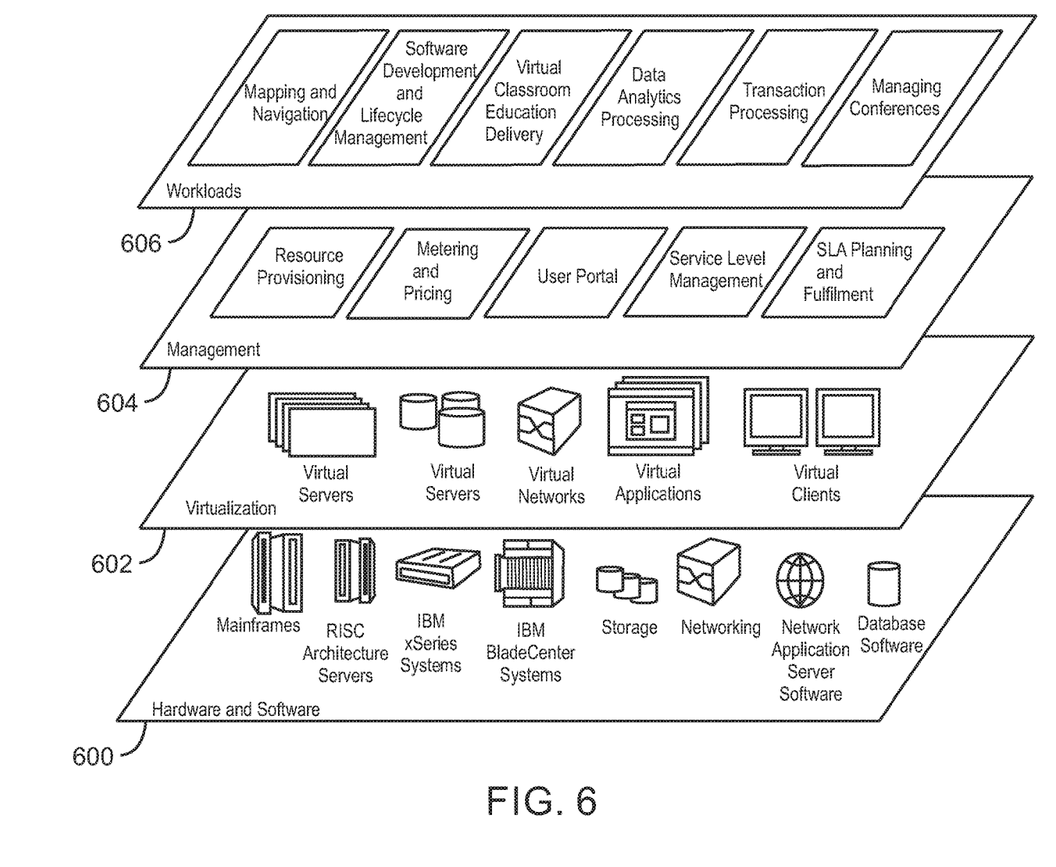
FIG. 6 depicts a set of functional abstraction layers provided by a cloud computing environment according to an embodiment described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer 602 provides an abstraction layer from which the following examples of virtual entities may be provided: virtual servers; virtual storage; virtual networks, including virtual private networks; virtual applications and operating systems; and virtual clients.

In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing conferences.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for conference management comprising:
a processor to:
    initiate, using a video conferencing application, a conference comprising a plurality of cameras and at least one user;
    process a series of images with at least one service of a cognitive server to generate service output, the series of images comprising an aggregation of images from the plurality of cameras;
    detect metadata associated with each of the series of images by the at least one service;
    aggregate the metadata and the service output based on a timestamp for each image to detect an event;
    log events and train the at least one service each time an event is logged;
    generate an alarm in response to detecting the event; and
    automatically modify the conference by adding additional cameras or additional users in response to a detecting of the event.

2. The system of claim 1, wherein the processor is to separate a video stream from each camera into the series of images based on a configuration rate of images per second.

3. The system of claim 1, wherein the at least one service comprises a facial recognition service.

4. The system of claim 1, wherein the at least one service comprises an image processing service.

5. The system of claim 1, wherein the processor is to record the conference.

6. The system of claim 1, wherein the processor is to modify the conference by adding additional sensors to collect sensor data.

7. The system of claim 1, wherein the conference is an SIP conference.

8. The system of claim 1, wherein the processor is to detect audio captured by the plurality of cameras and associate the audio with each image based on the timestamp.

9. The system of claim 1, wherein the metadata comprises a location of one of the plurality of cameras.

10. The system of claim 1, wherein the processor is to separate an audio stream and the video stream and analyze the audio stream and the video stream separately.

11. The system of claim 1, wherein the at least one service is to generate a three dimensional view of an object based on the aggregated images.

12. A processor implemented method for conference management comprising:
    initiating, using a video conferencing application, a conference comprising a plurality of cameras and at least one user;

processing a series of images with at least one service of a cognitive server to generate service output, the series of images comprising an aggregation of images from the plurality of cameras;

detecting metadata associated with each of the series of images by the at least one service;

aggregating the metadata and the service output based on a timestamp for each image to detect an event;

logging events and training the at least one service each time an event is logged;

generating an alarm in response to detecting the event; and automatically modifying the conference by adding additional cameras or additional users in response to a detecting of the event.

13. The method of claim 12 comprising separating a video stream from each camera into the series of images based on a configuration rate of images per second.

14. The method of claim 12, wherein the at least one service comprises an image processing service.

15. The method of claim 14, comprising executing a facial recognition service in response to the image processing service detecting a face in at least one of the images.

16. The method of claim 12, comprising modifying the conference by adding additional sensors to collect sensor data.

17. A computer program product for conference management, the computer program product comprising a computer readable storage medium having program instructions embodied therewith, wherein the computer readable storage medium is not a transitory signal per se, the program instructions executable by a processor to cause the processor to:

initiate, using a video conferencing application, a conference comprising a plurality of cameras and at least one user;

process a series of images with at least one service of a cognitive server to generate service output, the series of images comprising an aggregation of images from the plurality of cameras;

detect metadata associated with each of the series of images by the at least one service;

aggregate the metadata and the service output based on a timestamp for each image to detect an event;

log events and train the at least one service each time an event is logged;

generate an alarm in response to detecting the event; and automatically modify the conference by adding additional cameras or additional users in response to a detecting of the event.

18. The computer program product of claim 17, wherein the program instructions are executable by the processor to cause the processor to execute a facial recognition service in response to an image processing service detecting a face in at least one of the images.

19. The computer program product of claim 17, wherein the program instructions are executable by the processor to cause the processor to modify the conference by adding additional sensors to collect sensor data.

* * * * *